Patented July 4, 1950

2,514,329

UNITED STATES PATENT OFFICE 2,514,329

PREPARATION OF ALICYCLIC OXYGEN COMPOUNDS

Charles E. Morrell, Westfield, and Lester M. Welch, Madison, N. J., assignors to Standard Oil Development Company, a corporation of Delaware No Drawing. Application June 27, 1946, Serial No. 679,876

1 Claim. (Cl. 260—631)

This invention relates to a method for preparation of useful alicyclic oxygen derivatives by hydrogenolysis of their higher polyalkyl homologs and unsaturated analogs.

An object of this invention is to provide a method for achieving a controlled dealkylation of the polyalkyl alicyclic compounds.

The method is represented by hydrogenolysis of alicyclic ketones and alcohols having alkyl substituents, of which isophorone and its derivatives are examples.

Isophorone (3,5,5-trimethyl-$\Delta^2$-cyclohexenone) when reacted with hydrogen in the presence of a hydrogenation catalyst at temperatures in the range of 150° C. to 350° C. is converted to a series of saturated alicyclic oxygen derivatives having fewer methyl side chains attached to the ring. This reaction can be carried out to give various proportions of the derivatives depending upon the conditions employed.

Hydrogenation catalysts of known types, such as nickel, cobalt, iron, platinum, or palladium, on supports of alumina, silica, or adsorbent clays, and metal oxides, such as chromium oxide or molybdenum oxide, are considered effective. The hydrogen partial pressure may vary from about 1 atmosphere to 3,000 pounds per square inch gauge. The reaction may be carried out in either liquid or vapor phase with the catalyst in motion or fixed, but the exothermic nature of the reaction requires good temperature control. The preferred reaction temperature is in the range of 200° C to 350° C.

For the purpose of illustration, the following examples are given:

Example 1

200 ml. of isophorone was charged to a rocking hydrogenation bomb with approximately 20 g. of Raney nickel catalyst. The temperature of the mixture in the bomb was maintained at 240° C. and hydrogen was added at intervals to maintain a pressure of about 500 pounds per square inch gauge. After 12 hours' reaction time the following products were separated and recovered by distillation: (1) tetrahydroisophorone (3,3,5-trimethylcyclohexanol) 50%, (2) 3,5-dimethylcyclohexanol 30%, and (3) 3-methylcyclohexanol 6%. The remaining 14% was made up of other products including some ketones. The products of the reaction are either alcohols or ketones, depending upon conditions. Either the alcohols or ketones are valuable as intermediate raw materials for the production of dibasic acids.

The tetrahydroisophorone formed may be reacted with hydrogen itself or be recycled for reaction with isophorone to obtain additional dealkylation products. This hydrogenolysis of isophorone, its saturated analogs or homologs, is of special interest, since isophorone may be prepared from inexpensive available materials such as isopropyl alcohol or acetone.

Example 2

A rocking hydrogenation bomb was charged with 200 ml. of isophorone and 20 gms. of Raney nickel. Hydrogen in excess of 1 mole of $H_2$/mole of isphorone was added to the bomb during the course of the reaction. The temperature of the mixture in the bomb was maintained at 150° C. for 2½ hours. The principal products were (1) dihydroisophorone and (2) tetrahydroisophorone. Very little demethanation occurred, indicating that 150° C. is approximately the lower limit of operation.

Example 3

A rocking hydrogenation bomb was charged with 250 ml. of isophorone and 20 gm. of Raney nicked catalyst. Hydrogen pressure was initially 1100 pounds per square inch gauge, and the temperature was maintained at 300° C. for 11 hours. After two hours' reaction, the pressure had dropped to 600 pounds per square inch gauge, so hydrogen was again added to the bomb to increase the total pressure to 1100 pounds per square inch gauge. The total amount of hydrogen added was less than 3 moles of $H_2$/mole of isophorone. Atfer four hours' reaction time a sample of gas from the hydrogenation bomb showed 76% methane and only 4% hydrogen. No more hydrogen was added to the reaction mixture. The following reaction products were separated and recovered by distillation:

(1) Hydrocarbon materials 8%, (2) 3,5-dimethylcyclohexanone 70%, and (3) 3-methylcyclohexanone 8%. The remaining 17% was made up of other products including some alcohols.

Thus, the conditions can be controlled to obtain satisfactory yields of certain useful products. Control of the hydrogen partial pressure determines whether the alcohols or corresponding ketones are the final products. By keeping the reaction temperature within the proper limits, as indicated, during a suitable reaction period, the decomposition to undesired hydrocarbon products is satisfactorily restrained while the desired alicyclic alcohols or ketones are produced. The extent of the dealkylation is also varied by adjustment of the reaction temperatures within the limits given, e. g., demethanation of the intermediate alicyclic ketone and alcohol products being more extensive in the range of 300° to 350° C. to thereby form mainly the dialkyl and the mono-alkyl derivatives from the trialkyl and dialkyl compounds, respectively.

We claim:

The method of preparing dialkyl alicyclic derivatives of the class consisting of 3,5-dimethylcyclohexanone and 3,5-dimethylcyclohexanol from isophorone having 9 carbon atoms in the molecule, which comprises subjecting the isophorone to a controlled hydrogenolysis reaction with hydrogen in excess of 1 mole of hydrogen per mole of the isophorone under a pressure of about 500 to 1100 pounds per square inch in the presence of a hydrogenation catalyst at a reaction temperature in the range of 240° to 300° C. and for a reaction period of from 4 to about 12 hours.

CHARLES E. MORRELL.
LESTER M. WELCH.

REFERENCES CITED

The following references are of record in the file of this patent:

UNITED STATES PATENTS

| Number | Name | Date |
| --- | --- | --- |
| 2,198,375 | Bruson | Apr. 23, 1940 |
| 2,422,673 | Haensel et al. | June 24, 1947 |